April 9, 1957     E. BLAHA     2,787,920
AUTOMATIC TRANSMISSION
Filed Jan. 28, 1953     2 Sheets-Sheet 1

*INVENTOR.*
EMIL BLAHA

BY

ATTORNEY

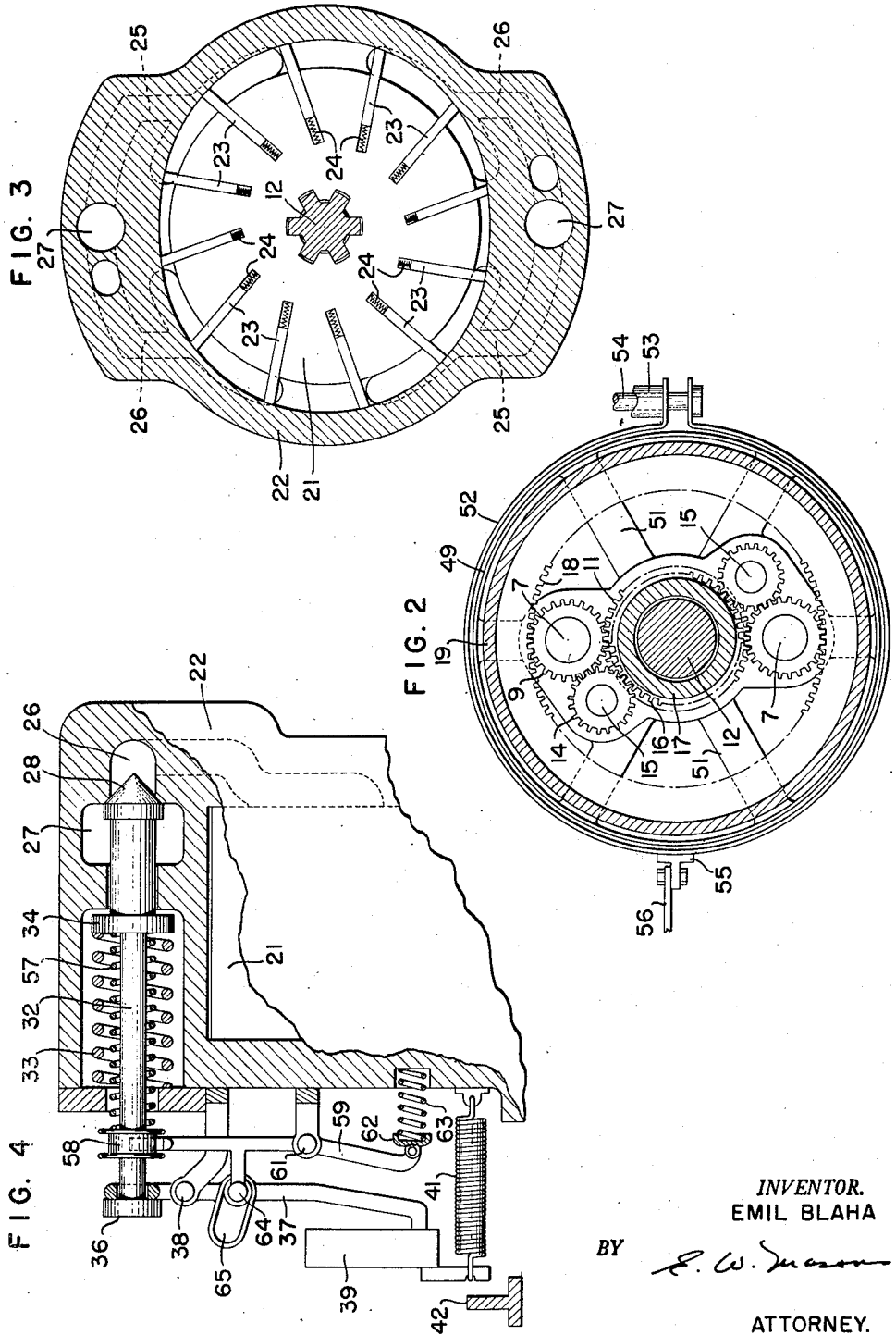

United States Patent Office 2,787,920
Patented Apr. 9, 1957

2,787,920
AUTOMATIC TRANSMISSION
Emil Blaha, Cheltenham, Pa.

Application January 28, 1953, Serial No. 333,790

7 Claims. (Cl. 74—751)

The present invention relates to torque amplifiers, and more particularly to torque amplifiers of the type that may be used to transmit power from the engine to the drive wheels in automobiles, trucks and the like. It will be readily appreciated, however, that the torque amplifier of the present invention is adapted to transmit power between any prime mover and object to be rotated.

It is an object of the present invention to provide a transmission device in which the gear ratio change from the ratio of the gears used in the device to one to one is infinitely and automatically variable.

It is a further object of the invention to provide a transmission device in which no low or intermediate gear trains are necessary since torque requirements for any particular condition can be met automatically within the range of the device.

In carrying out the invention, there are provided a driving shaft and a driven shaft that are connected by a planetary gear train of a given gear reduction. Also between the driving and driven members is a reaction device which is shown herein, by way of example, as being a positive displacement hydraulic pump. By varying the reaction of the system by regulating the flow of fluid through the pump, the torque transmitted through the gear train can be varied from a maximum determined by its ratio to a one to one ratio. The torque requirements for any given condition are met automatically in accordance with the power requirements of the driven shaft and the speed of the prime mover or drive shaft.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 2 is a section taken on line 2—2 of Figure 1;

Figure 3 is a section taken on line 3—3 of Figure 1; and

Figure 4 is a view of a modified form of valve controlling mechanism.

Figure 1:
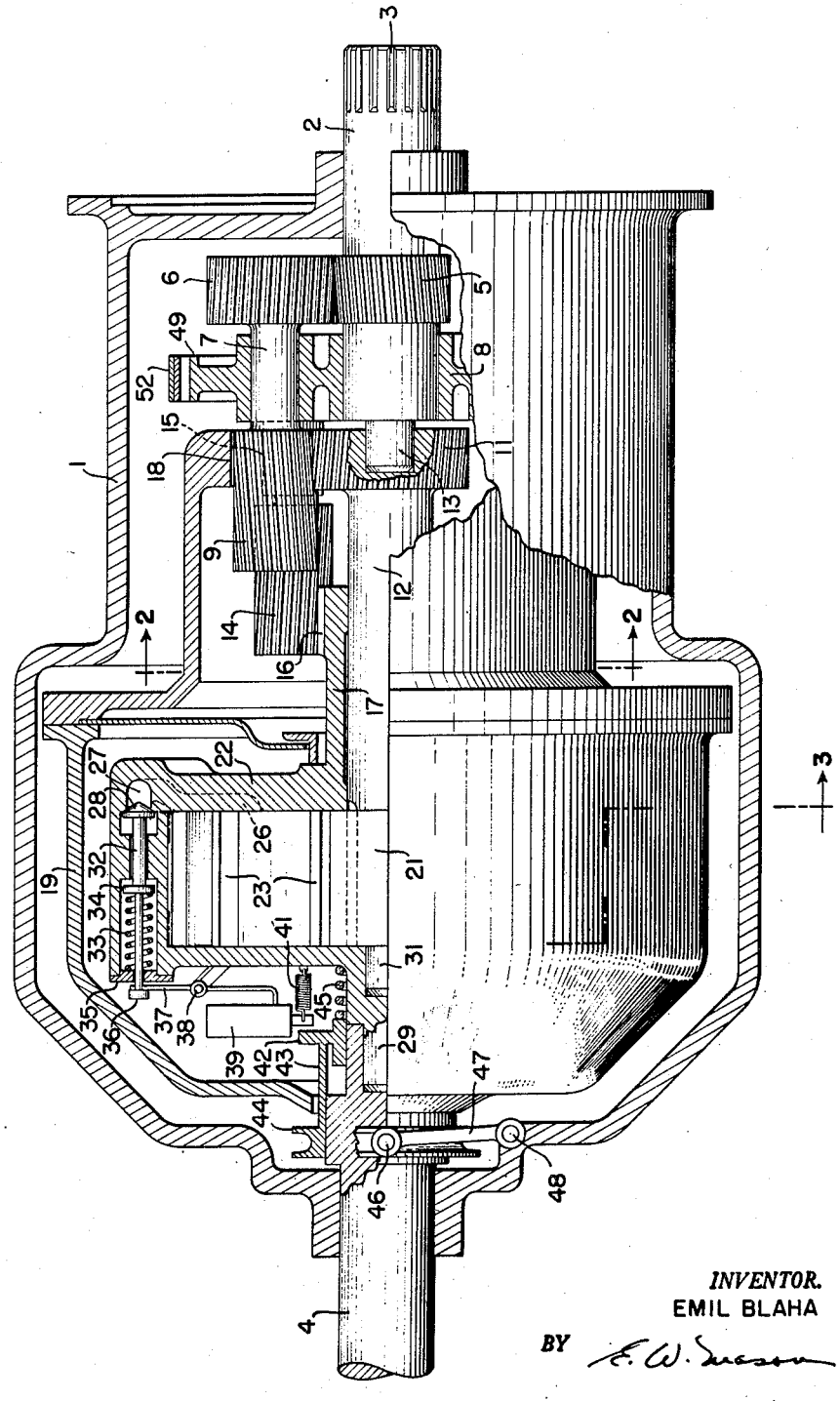
Figure 1 is a view, partly in section, of the transmission.

Referring first to Figures 1, 2 and 3 of the drawing, there is shown a casing 1 surrounding the entire transmission. Extending into the right end of the casing is a drive shaft 2 that is provided with splines 3 to be connected to a prime mover or other source of power. A driven shaft 4 extends from the left end of the housing. Both shafts are journaled for rotation in the housing on suitable bearings. Between the driving and driven shafts is a planetary gear train that includes a pinion 5 on shaft 2 which meshes with a gear 6 on a shaft 7. This shaft is journaled for rotation in a carrier 8 that is in turn mounted for rotation around the driven shaft 2.

The left end of shaft 7 is provided with an elongated pinion 9 which meshes with a gear 11 formed on the end of a shaft 12. It is noted that shaft 12 is provided with a socket that receives the reduced end 13 of shaft 2 to support the left end of that shaft for rotation. Pinion 9 also meshes with a pinion 14 on a shaft 15 that is journaled for rotation in the carrier 8. The pinion 14 drives a gear 16 formed on the end of a sleeve 17 which is concentric with the shaft 12 and is journaled thereon. It will, therefore, be seen from the gearing arrangement that rotation of shaft 2 will rotate the shaft 12 in one direction and the sleeve 17 in an opposite direction. It is noted that the carrier 8, as shown in Figure 2, is arranged to have two of the pinions 9 and two of the pinions 14 mounted thereon in order to balance the rotating parts.

The pinions 9 are also meshed with an internal gear 18 which is formed on the end of a secondary housing 19 that moves with or is formed as a part of the driven shaft 4. It will, of course, be understood that the housing 19 and shaft 4 will be fabricated of suitably cast and machined parts.

Shaft 12 and sleeve 17 respectively carry the parts of a reaction producing mechanism, which is shown herein as comprising a positive displacement hydraulic pump having a rotor 21 and a stator 22. This pump is of a type in which the rotor 21 is provided with a plurality of blades 23 that are biased outwardly in a radial direction by means of springs 24. The stator is provided with inlet passages 25 and outlet passages 26 that are joined by a chamber 27. Flow of the liquid through these passages as a result of relative rotation of the rotor and the stator is controlled by a relief valve 28 located in the chamber 27.

It is noted that the left side of the stator housing, which may also be fabricated of suitable machined or cast parts, is reduced to form a stub shaft 29 that is received in a socket on the right end of driven shaft 4. Similarly, the left end of shaft 12 is reduced as shown at 31 and is received in a socket formed concentric with the shaft 29. Thus, the various parts of the apparatus are maintained in axial alignment and are mounted so that they can rotate relative to each other. Suitable bearings may be provided for the various rotating parts.

In the operation of the mechanism, rotation of the shaft 2 will produce rotation of shaft 12 and sleeve 17 in opposite directions. If the relief valve 28 is open so that fluid can flow freely through the intake and exhaust passages 25 of the stator housing of the pump, there will be relative rotation of the parts of the gear train and the pump, and the gear 18 and housing 19 will not be rotated. On the other hand, if the valve 28 is moved to a position to close the fluid passage between passages 25 and 26, it will be impossible for relative rotation to take place between shaft 12 and sleeve 17, since the fluid used in the pump is an incompressible liquid. In this condition of the apparatus, the various gears are locked with respect to each other so that the gears, carrier 8 and the housing 19 will rotate as a unit with the shaft 2, thereby rotating the driven shaft 4 at the same speed of rotation as that imparted to the driving shaft 2. As the valve 28 is moved in chamber 27 to throttle variably the flow of fluid from the intake passages 25 to the exhaust passages 26 of the pump, relative rotation between shaft 12 and sleeve 17 will vary from the full relative movement imparted to these parts when the valve is open to no relative movement at all when the valve is closed. The reaction through the gear train produced as a result of obstructing the flow of fluid through the pump will cause rotation of the gears in the fashion of a normal planetary gear train to produce rotation of the gear 18 and the housing 19 upon which it is carried. Thus, it will be seen that the driven shaft 4 will be rotated by shaft 2 at various speeds and with a variable torque amplification depending upon the ratio of the gears in the gear train, and the amount of fluid flowing through the pump system. The torque that can be obtained as a result of the above operation will vary from a one to one ratio when there is no fluid moving through the pump system to a ratio equal to that of the ratio of the gears in the gear train. This will generally be designed to be a ratio in the neighborhood of four to one for automobiles, for example.

In order for the transmission to operate automatically to change the gear ratio in an infinite number of steps between the maximum and minimum, there is provided a means to control the operation of valve 28 in accordance with the torque requirements of the vehicle in which the transmission is incorporated.

The valve 28 has a stem which extends through a chamber formed in the housing 22 to a point beyond the end of the housing. This stem is surrounded by a spring 33, one end of which bears against the flange 34 on the valve stem and the other end of which bears against a cap 35 for the chamber through which the valve stem extends. The outer end of the valve stem has an enlargement 36, the inner face of which is engaged by a yoke formed on the upper end of a lever 37 that is pivoted to the housing at 38. The lower end of this lever is provided with a weight 39 which serves to move outwardly or to the left in Figure 1 under the action of centrifugal force as the housing rotates. The weight 8 is normally biased in a counter clockwise direction by a spring 41. The force of this spring acting through the lever 37 is sufficient to reduce the force of spring 33 on the valve to some relatively low value that can be computed with respect to the torque requirements of the transmission.

The weight and lever arrangement can be moved in a counter clockwise direction in order to open the valve 28 by means of a flange 42 that is axially movable along the inner end of shaft 4. This flange is connected by rods 43, which extend through openings in the housing 19, to a collar 44 that is also axially movable on shaft 4. The members 42 and 44 are normally biased to the left in Figure 1 away from the weight by means of a spring 45. Member 42, however, can be moved to the right by means of pins 46 of a yoke 47, which pins are received in the groove formed in collar 44. Yoke 47 is pivoted at 48 and may be moved by a suitable pedal similar to a clutch pedal in an automobile to shift valve 28 to its open position.

When the automobile or other mechanism to be driven is at rest and before the prime mover is started, collar 44 and member 42 will be moved to the right in the drawing thereby acting through lever 37 to open valve 28. At this time, the passage for the fluid from the pump is open so that regardless of the speed at which the shaft 2 is rotated, there will be no rotation of shaft 4 since there is no back pressure that would tend to cause the two parts of the pump to rotate together. In order to start the vehicle upon which the transmission is mounted, yoke 47 is permitted to move in a counter clockwise direction under the action of spring 45 so that valve 28 can move to its closed position under the combined action of springs 32 and 41. The relative strength of these springs is such that pressure of the fluid flowing through the valve passages, if the driven shaft 2 is speeded up, will be able to force the valve open sufficiently to prevent the engine from stalling. The back pressure in the fluid system, however, is sufficient to retard the relative rotation of shafts 17 and 12 so that the torque developed by the mechanism will be sufficient to overcome the reaction produced by shaft 4, and cause gear 18, housing 19 and shaft 4 to rotate. As the parts increase their speed of rotation, weight 39 will be moved in a clockwise direction under the action of centrifugal force to remove the effect of spring 41 on spring 33. Thereafter, full torque will be developed due to the obstruction of the flow passages by valves 28. At this time, the device will have gained sufficient speed so that housing 19 and shaft 4 will be rotating at the same speed as shaft 2. If for some reason increased torque should be desired, the reaction produced on the gear train will cause an increase in the fluid pressure of the pump so that the force of the fluid against the face of valve 28 will open this valve an amount depending upon the torque. Relative rotation of sleeve 17 and shaft 12 can then take place. This relative rotation, as explained above, will permit reduced speed of rotation of housing 19 and shaft 4 with respect to shaft 2 and increase the torque thereof in accordance with the ratio of the gear train.

From the above, it will be seen that the action of the fluid flowing through the pump system exerts its force on valve 28 in opposition of the force of spring 33 and will automatically cause this valve to open in an amount proportional to the torque requirements of the mechanism. Thus, there is an automatic torque amplification up to a value determined by the ratio of the gear train whenever such amplification is needed as in starting up or accelerating. This torque amplification also comes into effect when power is needed to climb a hill.

Reverse rotation of shaft 4 with respect to shaft 2 can be obtained through the gear train by preventing rotation of the carrier 8. To this end, the carrier is provided with a brake drum 49 that is mounted thereon by spokes 51 extending radially away from the carrier. The brake drum is engaged by a brake band 52 which encircles the same as is shown in Figure 2 of the drawing. One end of the brake band is provided with a sleeve 53, and the other end is provided with a rod 54. The band 52 is held in position by an anchor 55 attached thereto and a fixed abutment 56 on the casing 1. Relative movement of rod 54 and sleeve 53 will apply the brake to stop rotation of carrier 8. Shaft 4 will therefore be driven in a reverse direction through the gear train by shaft 2. During the time that the brake band is engaged with the brake drum 49, valve 28 will be open so that free relative rotation may take place between the parts of the pump. Suitable mechanism can be provided for holding this valve in its open position while the brake band is applied.

Another arrangement of the springs for controlling the flow of fluid in the pump system is shown in Figure 4. In this arrangement, there is provided a double spring for loading the pressure relief valve 28 in order to provide full torque amplification at low speeds without the necessity of racing the engine, and to compensate for the drooping torque characteristic of internal combustion engines at high speeds.

Referring to Figure 4, it will be seen that there is provided a second and smaller spring 57 surrounding the valve stem 32. One end of this spring bears against the abutment 34 on the valve stem while the other end bears against a collar 58 that is moved axially of the stem by a lever 59 pivoted on the pump casing at 61. The other end of the lever is provided with a cap 62 that receives the end of a spring 63. This latter spring, acting between the pump casing and the cap, tends to keep spring 57 under compression. The action of springs 57 and 63 is overcome, however, when the speed is increased. This is accomplished by a connection between levers 37 and 59 consisting of a pin 64 on an arm extending from lever 59 that is received in an opening 65 in lever 37.

When a vehicle having this form of spring loading for the valve is at rest, the collar 42 will be moved against the projection extending from weight 39 to act through lever 37 and open valve 32. Therefore, the fluid passage of the pump will be open permitting free relative rotation of the pump parts 21 and 22. There will, therefore, be no reaction in the planetary gear train, and no rotation of gear 18 and driven shaft 4.

With this embodiment of the invention, the action of spring 41 substantially counterbalances the action of spring 33 so that at slow speeds of the drive shaft the only force acting on valve 28 to hold it closed is that of springs 57 and 63. These latter springs provide only enough force so that a relatively large amount of fluid can flow through passages 25 and 26 of the pump. Relative rotation of the pump parts 21 and 22 will occur, but part 22 follows along with part 21 because the flow of fluid past valve 28 is somewhat obstructed. Therefore, the driven shaft 4 will be rotated with the full torque amplification or mechanical advantage of the gear train. As the speed of rotation of the driven shaft increases, the torque requirement on that shaft will be reduced. Therefore, the pressure of the fluid flowing in the pump system will be reduced and the springs will force valve 32 toward its closed position. As the flow of fluid past the valve decreases, the relative rotation of the pump parts will also decrease with a consequent increase in the speed of shaft 4 and decrease in torque amplification provided by the gear train.

As the speed of the pump stator 22 increases, the effect of centrifugal force on weight 39 will cause it to move outwardly so the full effect of spring 33 will be applied to valve 32. This same movement of the weight acting through pin 64 and lever 59 will move collar 58 away from spring 57, thus removing the effect of this spring on the valve. Thereafter, the pressure of the fluid in the pump system is opposed by the force of spring 33. In normal operation, spring 33 will keep valve 28 closed so that there will be no relative rotation between the pump parts. Driven shaft 4 will therefore be driven with a one to one ratio and will rotate at the same speed as driving shaft 2.

From time to time during the operation of the mechanism, torque requirements of the driven shaft will increase. The reaction on this shaft will then increase the pressure of the fluid to force valve 28 open. The consequent relative rotation or slip between the pump parts will act through the gear train to increase the gear ratio sufficiently to compensate for the increased torque requirements.

From the above, it will be seen that I have provided a transmission mechanism in which the torque requirements at any given speed are automatically obtained. No low or intermediate gear trains are needed since the torque requirements for any given condition can be met by building the gear train with the proper gear ratio, and using the proper relief valve loading. It will be apparent that other mechanical arrangements of the parts of the gear train and the pump can be made while retaining the same operation of the mechanism.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. In a device of the class described, the combination of a drive shaft, a driven shaft, and means to drive said driven shaft from said drive shaft comprising a planetary gear train including a drive gear connected to said drive shaft, a driven gear connected to said driven shaft, a rotatable carrier, a pair of oppositely rotating pinions mounted for rotation on said carrier and driven by said drive gear, one of said pinions meshing with said driven gear, a fluid pump including a pair of relatively rotatable members and a passage through which fluid flows between said members as they rotate relative to each other, means to drive each of said members from one of said pinions, a valve to control the flow of fluid through said pump, and resilient means acting normally to bias said valve toward its closed position.

2. The combination of claim 1 including centrifugally operated means to reduce the effectiveness of said resilient means upon said valve as said driven shaft slows down.

3. In a transmission of the class described, the combination of a housing, a drive shaft extending into said housing, a driven shaft extending into said housing, means in said housing to drive said driven shaft from said drive shaft comprising a planetary gear train including a drive gear connected to said drive shaft, a driven gear connected to said driven shaft and pinions rotated by said drive shaft, a fluid pump including a pair of relatively rotatable members and a fluid passage forming a closed circuit between said members through which fluid flows, said members operating to produce a flow of fluid under pressure in said passage, a valve operable to control flow of fluid in said passage, means to rotate said pump members relative to each other by the pinions of said gear train, and means to control the adjustments of said valve in accordance with the torque requirements on said driven shaft as determined by the pressure of said fluid.

4. In a device of the class described, the combination of a drive shaft, a coaxial driven shaft, means to drive said driven shaft from said drive shaft comprising a planetary gear train having input and output gears connected to said shafts respectively, a reaction mechanism including a pair of relatively rotatable members, means to mount said members coaxial with said shafts, means including gears of said gear train operative to rotate said members in opposite directions, the relative rotation of said members reacting through said gear train to control rotation of said driven shaft with the speed of rotation of said driven shaft increasing for a given speed of said drive shaft as the relative rotation of said members decreases, and resiliently operated valve means responsive to the torque requirements of said driven shaft to control the relative rotation of said members.

5. In a device of the class described, the combination of a drive shaft, a coaxial driven shaft, means to rotate said driven shaft from said drive shaft including a planetary gear train having a first gear driven by said drive shaft, a second gear to drive said driven shaft, a carrier coaxial with said shafts and a pair of oppositely rotating gears on said carrier, a reaction mechanism including a pair of relatively rotatable members coaxial with said carrier, each member being driven positively by one of said oppositely rotating gears, and resiliently operated means to control the relative rotation of the members of said reaction mechanism in response to the torque requirements of said driven shaft.

6. In a device of the class described, the combination of a planetary gear train having a drive gear, a driven gear, a rotatable carrier, gears on said carrier meshing with said first two mentioned gears and including a first pinion, a second pinion also on said carrier and driven by said first pinion, a reaction mechanism including a pair of relatively rotatable members that are rotatable about the same axis as said carrier, the members of said mechanism being provided with gears meshing with said pinions respectively whereby they are driven in opposite directions by said pinions, means to retard relative rotation between said members to thereby produce rotation of said driven gear, and means to adjust said retarding means in accordance with torque requirements on said driven gear.

7. In a device of the class described, the combination of a planetary gear train having a driving gear, a driven gear, a rotatable carrier, gears on said carrier meshing with said first two gears including a first pinion, a second pinion also on said carrier and meshing with said first pinion, a hydraulic pump having a pair of relatively rotatable members rotatable around an axis concentric with that of said carrier and a passage, relative rotation of said members producing a flow of liquid in said passage between said members, means to drive said members directly from said pinions, means to control the flow of liquid through said passage and thereby the relative rotation of said members, and means to adjust said control means jointly by the pressure of the flowing liquid and the speed of rotation of one of said members.

References Cited in the file of this patent

UNITED STATES PATENTS

| | | |
|---|---|---|
| 1,667,290 | Gayer | Apr. 24, 1928 |
| 1,688,852 | Christie | Oct. 23, 1928 |
| 2,079,691 | Joyce | May 11, 1937 |
| 2,173,855 | Orshansky | Sept. 26, 1939 |
| 2,423,820 | Baumann | July 15, 1947 |
| 2,470,241 | Diard | May 17, 1949 |
| 2,477,528 | Shrader | July 26, 1949 |
| 2,573,472 | Martin | Oct. 30, 1951 |
| 2,590,305 | Foster | Mar. 25, 1952 |

FOREIGN PATENTS

| | | |
|---|---|---|
| 510,189 | Belgium | Apr. 15, 1952 |
| 633,458 | Germany | July 29, 1936 |